United States Patent [19]
Ducret et al.

[11] Patent Number: 5,965,179
[45] Date of Patent: Oct. 12, 1999

[54] TREATMENT OF CHOCOLATE SO THAT THE CHOCOLATE TREATED CONTAINS ADDED WATER

[75] Inventors: Pierre Ducret, St Saphorin/Morges; Katrin Holz, Pully; Junkuan Wang, Lausanne, all of Switzerland; Hans-Juergen Wille, Skelton, United Kingdom

[73] Assignee: Nestec S.A., Vevey, Switzerland

[21] Appl. No.: 08/837,007

[22] Filed: Apr. 11, 1997

[30] Foreign Application Priority Data

Apr. 12, 1996 [EP] European Pat. Off. ............. 96200986

[51] Int. Cl.$^6$ ..................................................... A23G 7/00
[52] U.S. Cl. .................... 426/72; 426/73; 426/74; 426/573; 426/631; 426/660; 426/516; 426/804
[58] Field of Search ..................................... 426/573, 576, 426/660, 804, 631, 72, 73, 74

[56] References Cited

U.S. PATENT DOCUMENTS

| | | | |
|---|---|---|---|
| H1527 | 4/1996 | Moore | 426/660 |
| 1,649,307 | 11/1927 | Hunter | 426/516 |
| 2,760,867 | 8/1956 | Kempf et al. | 99/24 |
| 2,904,438 | 9/1959 | O'Rourke | 99/24 |
| 3,023,104 | 2/1962 | Battista | 99/1 |
| 4,081,559 | 3/1978 | Jeffrey et al. | 426/103 |
| 4,446,166 | 5/1984 | Griddey et al. | 426/631 |
| 4,563,358 | 1/1986 | Mercer et al. | 426/89 |
| 4,637,937 | 1/1987 | Terada et al. | 426/520 |
| 4,713,256 | 12/1987 | Chaveron et al. | 426/631 |
| 4,837,042 | 6/1989 | Vajda et al. | 426/615 |
| 4,865,856 | 9/1989 | Groen | 426/231 |
| 5,004,623 | 4/1991 | Giddey et al. | 426/564 |
| 5,063,080 | 11/1991 | Kruger et al. | 426/660 |
| 5,102,680 | 4/1992 | Glass et al. | 426/572 |
| 5,120,566 | 6/1992 | Baba et al. | 426/631 |
| 5,149,560 | 9/1992 | Kealey et al. | 426/602 |
| 5,160,760 | 11/1992 | Takemori et al. | 426/660 |
| 5,260,083 | 11/1993 | Brain et al. | 426/573 |
| 5,275,835 | 1/1994 | Masterson et al. | 426/607 |
| 5,366,742 | 11/1994 | Tuason, Jr. et al. | 426/96 |
| 5,425,957 | 6/1995 | Gaim-Marsoner et al. | 426/98 |
| 5,439,695 | 8/1995 | Mackey | 426/573 |
| 5,464,649 | 11/1995 | St John et al. | 426/660 |
| 5,503,863 | 4/1996 | Brain et al. | 426/573 |
| 5,505,982 | 4/1996 | Krawczyk et al. | 426/660 |
| 5,527,556 | 6/1996 | Frippiat et al. | 426/573 |
| 5,709,896 | 1/1998 | Hartigan et al. | 426/103 |
| 5,709,903 | 1/1998 | St John et al. | 426/660 |

FOREIGN PATENT DOCUMENTS

| | | |
|---|---|---|
| 0401427 | 12/1990 | European Pat. Off. |
| 1538750 | 1/1979 | United Kingdom |

OTHER PUBLICATIONS

Database Abstract, Derwent Info Ltd., WPI Accession No. 87–291818/42, Abstract of Menzi, et al., Swiss Patent CH 662 041 (1987).

*Primary Examiner*—Cynthia L. Nessler
*Attorney, Agent, or Firm*—Vogt & O'Donnell, LLP

[57] ABSTRACT

To incorporate water into a chocolate, chocolate and an emulsion or dispersion of a thickening or gelling substance in water, particularly a dispersion of microcrystalline cellulose in water, are introduced into an extruder and mixed and passed to an extruder nozzle so that the chocolate mass extrudate from the nozzle has a temperature of from 0° C. to 28° C.

15 Claims, No Drawings

TREATMENT OF CHOCOLATE SO THAT THE CHOCOLATE TREATED CONTAINS ADDED WATER

BACKGROUND OF THE INVENTION

The invention relates to the preparation of chocolate products with the incorporation of water.

Chocolate is composed of a fatty phase, e.g., cocoa butter and if necessary, lactic fat, and contains essentially solid compounds, for example, cellulose fibres, sugar crystals and dispersed proteins. In the preparation of chocolate, finely ground or refined cocoa powder is converted to a fluid suspension of sugar, cocoa and if necessary, milk powder in the fatty phase by the operation of conching. The water content of a chocolate is approximately 1 wt. % before conching and <1% after this operation which causes evaporation of the water.

In the field of confectionery/chocolate-making, there is considerable interest in increasing the heat resistance of chocolate and reducing its calorie content. Various methods have been proposed for achieving these results.

One method involved the direct incorporation of water or humectants, for example, glycerol. This method of incorporation gives rise to a considerable and rapid increase in the viscosity, due to the fact that said compounds react with the sugar, which is dispersed in the lipid phase of the chocolate, to form agglomerates. The chocolate thus transformed is practically impossible to handle and produces a coarse, sandy sensation in the mouth. Even the subsequent removal of the water does not alter this degraded texture.

Other methods involved adding hydrated substances, foams, syrups, gels, or water-in-oil or oil-in-water emulsions. An example of such an approach is provided by the process described in U.S. Pat. No. 5,160,760, according to which an emulsion of a solution of carbohydrate and a fat is prepared in the presence of an emulsifier, after which the emulsion is mixed with a tempered mass of chocolate.

SUMMARY OF THE INVENTION

The problem of incorporating water in chocolate has been solved according to the invention by circumventing the difficulty created by increasing the viscosity.

The invention provides a process for the preparation of chocolate and similar products characterised in that chocolate or a product similar to chocolate and a composition containing water are introduced into an extruder in which the mixture is mixed at a controlled temperature, and the mixture is then passed through a nozzle, with the result that the chocolate mass emerging is at a temperature of 0 to 28° C. The process provides for obtaining a chocolate having from 3 to 20 wt. % added water incorporated therein.

In the context of the invention, the term "product similar to chocolate" means a confectionery product of which the composition is similar to that of chocolate owing to the fact that all or part of the cocoa butter is replaced by a fat of vegetable origin or a mixture of fats of vegetable origin used commonly in confectionery and the physical/chemical properties of which are similar or equivalent to those of cocoa butter. Consequently, the term chocolate is used here and in the claims to designate chocolate and products similar thereto.

DETAILED DESCRIPTION OF THE INVENTION

In the context of the invention, a composition containing water may be an emulsion or a dispersion of a thickening or gelling substance in water. The gelling agent used may be, for example, a carrageenan, a gellan, a gum, gelatin or microcrystalline cellulose. The use of microcrystalline cellulose is preferred because it contains no calories and produces an improved sensation in the mouth. Such a composition may contain a polyol, for example, glycerol, if an improvement in the microbiological stability of the chocolate is desired. It may advantageously contain water-soluble substances, for example, flavourings, preservatives, active substances, trace elements and/or vitamins.

Advantageously, an aqueous gel is prepared by dispersing the desired quantity of microcrystalline cellulose, representing 5 to 20 wt. % and preferably 5 to 8 wt. % of the composition, in water by means of a high-speed mixer. If necessary, preservative salts, for example, sodium benzoate and potassium sorbate are added to the aqueous composition prior to the addition of the gelling agent. Finally, the other water-soluble constituents are added after the gelling agent has been suitably dispersed. It is possible to add glycerol, for example, to reduce the activity of the water, for example in a quantity of about 10 wt. % of the aqueous composition. It is also possible to add an emulsifier thereto, for example, lecithin, a fatty acid and polyglycerol ester, or a mixture of such emulsifiers so as to improve the distribution of the aqueous composition in the chocolate mass and thereby to ensure greater microbiological stability of the end product.

As a variant, it is possible to use an emulsion as the composition containing water, for example, a cream or an evaporated or condensed milk.

By incorporating water, it is possible to prepare functional chocolates with nutritional value, for example, by incorporating calcium therein, for example in the form of calcium lactate, and vitamins, for example, vitamin C.

To implement extrusion, it is possible to use a single screw or twin screw extruder with a double jacket barrel fitted with cooling means. A twin screw extruder which achieves a better mixing of the components is preferred. The screws may be composed of successive sectors where their shape varies from one sector to another, for example, from the point of view of the orientation of the threads and their pitch. The configuration of the screws is preferably adapted to maximise mixing and pumping of the mass towards the outlet nozzle whilst limiting shear. It is possible to provide intermediate agitation zones, for example by single or double lobed discs with a positive orientation having a transport effect, or a negative orientation having a return effect, or a sector with an inverse screw pitch giving rise to return. The screws may rotate in opposite directions or preferably in the same direction. The speed of the screws is 50 to 500 rpm, and preferably 250 to 400 rpm. The barrel and if necessary, the screw(s) are fitted with cooling means composed of a double jacket with, preferably, one autonomous cooling circuit per sector, with valves to regulate the flow of coolant and if necessary, a cooling circuit for the screw(s), allowing modulated temperature regulation. The outlet nozzle may have various configurations, and a cutting element may be provided at the outlet of the extruder, for example, allowing the chocolate mass to be formed, for example, into single portions, bars or slabs.

It is possible to introduce the chocolate into the extruder in the coarsely ground state or in powder form. It may be dark chocolate, milk chocolate or a white chocolate wherein the mass does not contain any non-fat cocoa solids. The chocolate has preferably been tempered beforehand. Said mass is introduced in a controlled manner into the extruder, for example, by means of a distribution hopper fitted, for example, with a forcing screw.

The liquid chocolate mass and the composition containing water may also be introduced separately directly into the extruder, in which case it is preferable to use a twin screw extruder due to its better mixing capacity.

As a variant, which is not preferred, it is possible to premix the liquid chocolate mass with the composition containing water and to introduce the premix into the extruder.

The composition containing water, preferably in the form of a pumpable gel or emulsion, may be introduced into the extruder by means of a metering pump. The temperature of the barrel is adjusted such that the mass leaving the apparatus has a temperature of 0 to 28° C. and preferably 18 to 22° C.

The chocolate leaving the extruder takes the form of a highly plastic mass rather than a mass in the form of a viscous fluid, but this plasticity declines with time and, after about 30 minutes to a few hours, the chocolate becomes brittle. The duration of this physical transformation depends on the water content and the extrusion conditions. The end product thus has a consistency ranging from hard to soft depending on whether it contains 3 to 20 wt. % of water.

The product obtained contains fewer calories, has a similar taste and better heat resistance than a standard chocolate. It may act as a vehicle for nutritional or functional constituents, for example, humectants or flavourings, or biologically active substances. It is used preferably as a casing or centre, coated with tempered chocolate, without incorporated water, or introduced into a moulded shell of tempered chocolate without incorporated water.

EXAMPLES

The examples below, in which the percentages and parts are based on weight, unless otherwise indicated, illustrate the invention.

Example 1

A gelled aqueous composition is prepared by dispersing 6% of microcrystalline cellulose (AVICEL RC-591 F) in 84% of water with vigorous agitation in a high-speed mixer, and once the gel has formed, 10% of glycerol are added thereto. The chocolate in powder form (particle size < or =1 mm), tempered beforehand, is introduced by means of a controlled distribution hopper into an extruder with twin screws rotating in the same direction, fitted with a cooling system, into which the gelled aqueous composition is injected by means of a metering pump. By way of comparison, the same chocolate powder alone is extruded. The extrusion parameters and the texture of the extrudate are given in Table 1 below. The chocolate obtained is creamier and less bitter than the chocolate used as a reference.

TABLE 1

| Chocolate (%) | Gel (%) | Chocolate flow (kg/h) | Gel flow (kg/h) | Speed of screws (rpm) | Outlet temp. of extrudate (° C.) | Texture of extrudate |
|---|---|---|---|---|---|---|
| 80 | 20 | 8 | 2 | 400 | 19 | soft, keeps its shape |
| 85 | 15 | 8.5 | 1.5 | 400 | 20 | fairly soft |
| 90 | 10 | 13.5 | 1.5 | 400 | 20 | slighty soft |
| 93 | 7 | 10 | 0.75 | 300 | 21 | solid |
| 95 | 5 | 9.5 | 0.5 | 250 | 25 | solid |

TABLE 1-continued

| Chocolate (%) | Gel (%) | Chocolate flow (kg/h) | Gel flow (kg/h) | Speed of screws (rpm) | Outlet temp. of extrudate (° C.) | Texture of extrudate |
|---|---|---|---|---|---|---|
| Comparison 100 | 0 | 7 | 0 | 400 | 9 | solid |

Example 2

The procedure is the same as in Example 1 except that 0.05% of sodium benzoate and 0.05% of potassium sorbate are added to the gel as preservatives. The physical characteristics of the products obtained are similar to those of the chocolates prepared according to Example 1.

Example 3

The procedure is the same as in Example 2, except that 5% of calcium lactate is added to the gel, which corresponds to 1% of calcium lactate (0.13% of calcium) incorporated in the chocolate. This level of calcium lactate had no effect on the organoleptic qualities of the chocolate. The composition of the gel is as follows: water 79.8%, microcrystalline cellulose 5.7%, glycerol 9.5%, sodium benzoate 0.05%, potassium sorbate 0.05%, calcium lactate 0.5%. The extrusion conditions and the compositions of the products are given in Table 2 below.

TABLE 2

| Chocolate (%) | Gel (%) | Chocolate flow (kg/h) | Gel flow (kg/h) | Speed of screws (rpm) | Outlet temp. of extrudate (° C.) | Calcium content of chocolate (%) |
|---|---|---|---|---|---|---|
| 80 | 20 | 8 | 2 | 350 | 20 | 0.13 |
| 85 | 15 | 8.5 | 1.5 | 400 | 21 | 0.1 |
| 90 | 10 | 9 | 1 | 350 | 21 | 0.06 |

Example 4

The procedure is the same as in Example 2 except that 0.35% of ascorbic acid is added to the gel, which corresponds to 52.5 mg of vitamin C in 100 g of chocolate with 15% of gel in the chocolate. The gel thus has the following composition: water 83.55%, microcrystalline cellulose 6%, glycerol 10%, sodium benzoate 0.05%, potassium sorbate 0.05%, ascorbic acid 0.35%. The extrusion conditions and the compositions of the products are given in Table 3 below.

TABLE 3

| Chocolate (%) | Gel (%) | Chocolate flow (kg/h) | Gel flow (kg/h) | Speed of screws (rpm) | Outlet temp. of extrudate (° C.) | Vitamin C content of chocolate (mg/100 g) |
|---|---|---|---|---|---|---|
| 85 | 15 | 5.7 | 1 | 400 | 21 | 52.5 |
| 90 | 10 | 7.2 | 0.8 | 300 | 20 | 35 |

Example 5

The procedure is the same as in Example 2 except that 2% of lecithin is added to the gel. To this end, the emulsifier is first dispersed in glycerol, then the dispersion is mixed with the gel. The gel thus has the following composition: water 82.2%, microcrystalline cellulose 5.9%, glycerol 9.8%, sodium benzoate 0.05%, potassium sorbate 0.05%, lecithin 2%. The chocolate obtained has a smooth surface and a slightly sticky texture. The extrusion conditions and the compositions of the products are given in Table 4 below.

TABLE 4

| Chocolate (%) | Gel (%) | Chocolate flow (kg/h) | Gel flow (kg/h) | Speed of screws (rpm) | Outlet temp. of extrudate (° C.) | Texture of the extrudate |
|---|---|---|---|---|---|---|
| 85 | 15 | 5.7 | 1 | 400 | 19 | soft, smooth surface |

By proceeding as above but using 2% of esters of polyglycerol and fatty acids (SUNSOFT 818 SX, Taiyo Kagaku Co. Ltd, Japan) instead of lecithin as an emulsifier, a chocolate having the same characteristics as those given in Table 4 above is obtained.

We claim:

1. A process for adding water to chocolate comprising preparing an aqueous dispersion gel comprising microcrystalline cellulose in water wherein the dispersion gel comprises the microcrystalline cellulose in an amount of from 5 wt. % to 20 wt. %, rotating at least one extruder screw in an extruder and introducing solid chocolate pieces into the extruder and introducing the dispersion gel in the extruder so that the dispersion gel is injected into the chocolate so that the at least one rotating extruder screw mixes the chocolate and dispersion to obtain a mixture which comprises the dispersion in an amount of from 10 wt. % to 20 wt. % and so that the mixture is passed through the extruder at a temperature of from 0° C. to 28° C. to an extruder outlet nozzle to obtain a chocolate composition comprising water from the nozzle.

2. A process according to claim 1 wherein the dispersion gel comprises the microcrystalline cellulose in an amount of from 5 wt. % to 8 wt. %.

3. A process according to claim 1 wherein the dispersion gel prepared further comprises a polyol.

4. A process according to claim 3 wherein the polyol is glycerol.

5. A process according to claim 1 or 3 or 4 wherein the dispersion gel prepared further comprises an emulsifier.

6. A process according to claim 5 wherein the emulsifier is selected from the group consisting of lecithin, a fatty acid ester and a polyglycerol ester.

7. A process according to claim 1 wherein the dispersion gel prepared further comprises condensed milk.

8. A process according to claim 1 wherein the dispersion gel prepared further comprises cream.

9. A process according to claim 1 wherein the dispersion gel prepared further comprises a substance selected from the group consisting of a calcium composition and vitamins.

10. A process according to claim 9 wherein the substance is calcium lactate.

11. A process according to claim 9 wherein the substance is vitamin C.

12. A process according to claim 1 wherein the temperature is from 18° C. to 22° C.

13. A process according to claim 1 wherein the chocolate pieces have a size of 1 mm and less.

14. A process according to claim 1 wherein the chocolate introduced into the extruder is a tempered chocolate.

15. A process according to claim 1 wherein the extruder is a twin screw extruder and two screws are rotated for the mixing and passing.

* * * * *